(12) United States Patent
Himberger et al.

(10) Patent No.: US 7,474,217 B2
(45) Date of Patent: *Jan. 6, 2009

(54) SYSTEM AND METHOD TO TRACK INVENTORY USING RFID TAGS

(75) Inventors: Kevin D. Himberger, Durham, NC (US); Clark D. Jeffries, Chapel Hill, NC (US); Mohammad Peyravian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/939,682

(22) Filed: Nov. 14, 2007

(65) Prior Publication Data

US 2008/0061982 A1 Mar. 13, 2008

Related U.S. Application Data

(63) Continuation of application No. 11/333,122, filed on Jan. 17, 2006, now Pat. No. 7,348,886.

(51) Int. Cl.
*G08B 13/14* (2006.01)
(52) U.S. Cl. .............. 340/572.1; 340/572.4; 340/572.7; 340/572.8; 340/10.1; 340/10.4; 340/5.92; 235/375; 235/384; 235/492
(58) Field of Classification Search .............. 340/572.1, 340/572.4, 572.7, 572.8, 10.1, 10.4, 5.92; 235/375, 384, 492
See application file for complete search history.

(56) References Cited

U.S. PATENT DOCUMENTS

| | | | |
|---|---|---|---|
| 5,550,547 A | 8/1996 | Chan et al. | |
| 5,565,858 A * | 10/1996 | Guthrie | 340/10.33 |
| 5,757,923 A | 5/1998 | Koopman | |
| 6,422,476 B1 | 7/2002 | Ackley | |
| 6,641,052 B2 | 11/2003 | Baillod et al. | |
| 6,661,339 B2 | 12/2003 | Muirhead | |
| 6,774,766 B1 | 8/2004 | Moyer | |
| 6,943,678 B2 | 9/2005 | Muirhead | |
| 7,005,985 B1 * | 2/2006 | Steeves | 340/572.1 |
| 7,173,530 B2 * | 2/2007 | Lambright et al. | 340/572.8 |
| 2005/0237184 A1 | 10/2005 | Muirhead | |

(Continued)

OTHER PUBLICATIONS

U.S. Appl. No. 60/177,386, Scott A. W. Muirhead, filed on Jan. 24, 2000.

Henrici, D. et al., "Trackling Security and Privacy Issues in Radio Frequency Identification Devices," Pervasive Computing, Second International Conference, PERVASIVE 2004, Proceedings Apr. 18-23, 2004.

(Continued)

*Primary Examiner*—Tai T Nguyen
(74) *Attorney, Agent, or Firm*—Arthur J. Samodovitz

(57) ABSTRACT

System and method for tracking inventory of a multiplicity of products. First RFID tags are associated with respective products or groups of products. Second Active RFID tags are associated with respective first containers for the multiplicity products. A third Active RFID tag is associated with a second container for the first containers. First RFID tags broadcast their respective identifications. Second Active RFID tags hash the identities of the first RFID tags within their respective first containers and broad their hashed values. Third Active RFID tag hash the hashed values broadcast by the second Active RFID tags. An expected value is compared to a result of the third Active RFID tag hashing the hashed values broadcast by the second Active RFID tags.

6 Claims, 3 Drawing Sheets

U.S. PATENT DOCUMENTS

2005/0241548 A1 11/2005 Muirhead
2006/0243174 A1 11/2006 Muirhead
2007/0137531 A1 6/2007 Muirhead
2007/0171080 A1 7/2007 Muirhead

OTHER PUBLICATIONS

Gragg, Jeremy, "Radio Frequency Identification: Technical and Societal Issues," Oregon State University ECE 399H Final Paper, Dec. 10, 2003.

* cited by examiner

SYSTEM AND METHOD TO TRACK INVENTORY USING RFID TAGS

CROSS REFERENCE TO RELATED APPLICATION

This is a continuation of U.S. patent application Ser. No. 11/333,122 which was filed on Jan. 17, 2006, now U.S. Pat. No. 7,348,886 to Himberger et al.

FIELD OF THE INVENTION

The present invention relates generally to inventory tracking systems, and more particularly to an inventory tracking system using RFID tags.

BACKGROUND

Active RFID tags are well known today. For example, the Matrics Group manufactures "MicroSensys™" Active RFID tags, and KSW Microtec manufactures "Smart Active Label™" Active RFID tags. An Active RFID tag includes a small battery, and transmits RF signals via an integral antenna. The battery adds significant cost to the Active RFID tag. The Active RFID may be preprogrammed with an identity that represents the identity of the product which bears the RFID tag. The transmitted RF signals typically include the identity of the Active RFID tag. If the Active RFID tag includes data such as a recorded temperature, the Active RFID tag may transmit the data as well. An Active RFID tags can effectively transmit to a receiver up to 100 meters away.

Passive RFID tags are also well known today. A Passive RFID tag does not include a battery; instead, the Passive RFID tag has an integral antenna which receives RF signals from an Active RFID tag or remote transceiver. The transmitted RF signals power the Passive RFID tag, i.e. the Passive RFID tag captures the energy of the RF signals which it receives and uses the energy to drive transceiver and other circuitry on the Passive RFID tag. The transceiver circuitry on the Passive RFID tag transmits the identity coded into the Passive RFID to identify the product which bears the Passive RFID tag. The Passive RFID tag may also include a memory to store any type of information transmitted by the Active RFID tag or other remote transceiver. Typically, Passive RFID tags have a range of about three meters.

A known remote transceiver reads the identity information broadcast by the Passive RFIDs or Active RFIDs. The remote transceiver can read RFID tags on packages contained in a box to determine what packages the box contains or to confirm that the packages are all there. Also, the remote readers can read RFID tags on packages at a cash register to determine an amount to charge to the customer (as does a known bar code reader). Also, the remote readers can detect packages at a store exit which bear RFID tags which have not been "disabled" at a cash register, and thereby detect shoplifters.

An object of the present invention is to track inventory such as boxes and packages within the boxes.

Another object of the present invention is to track inventory of boxes and packages within shipping containers.

SUMMARY OF THE INVENTION

The present invention resides in a system and method for tracking inventory of a multiplicity of products. First RFID tags are associated with respective products or groups of products. Second Active RFID tags are associated with respective first containers for the multiplicity products. A third Active RFID tag is associated with a second container for the first containers. First RFID tags broadcast their respective identifications. Second Active RFID tags hash the identities of the first RFID tags within their respective first containers and broadcast their hashed values. Third Active RFID tag hash the hashed values broadcast by the second Active RFID tags. An expected value is compared to a result of the third Active RFID tag hashing the hashed values broadcast by the second Active RFID tags.

In accordance with features of the present invention, the first RFID tags are Passive RFID tags and the second Active RFID tags are attached to packages containing each product or group of products.

DETAILED DESCRIPTION OF THE PREFERRED EMBODIMENTS

Figure 1:
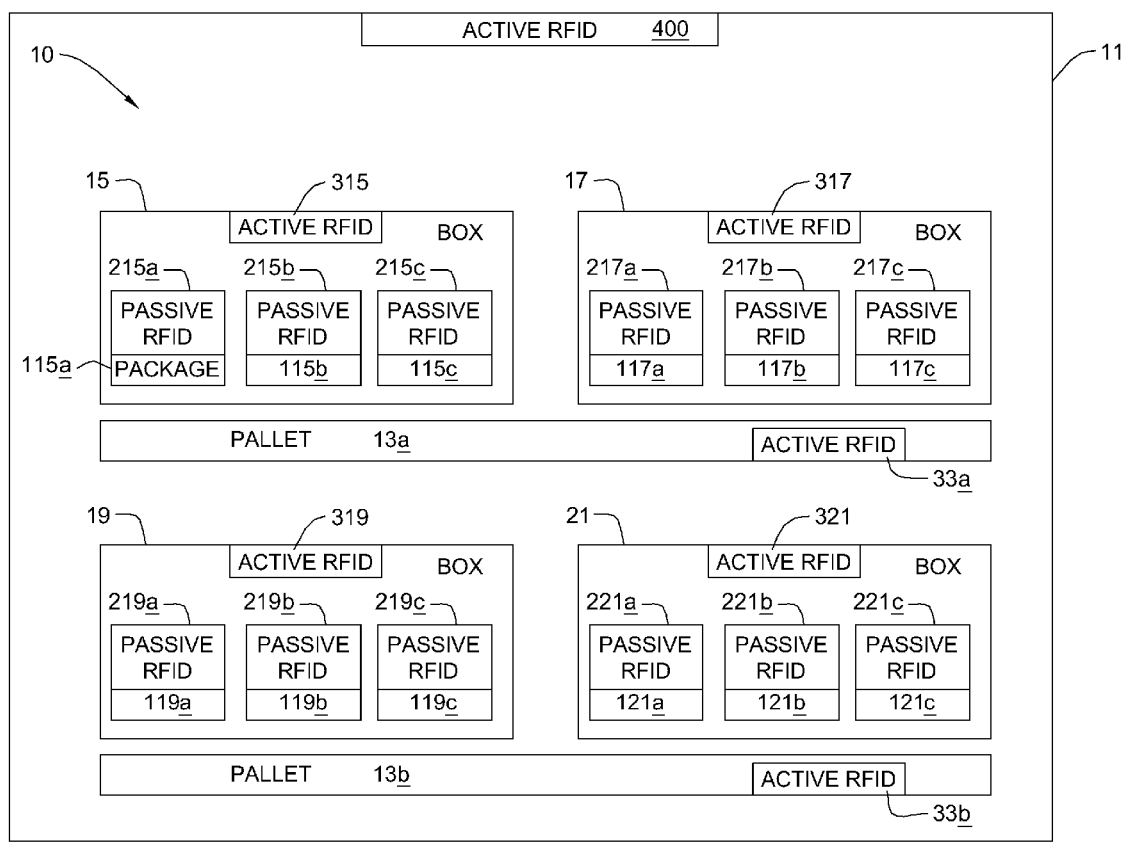
FIG. 1 is a block diagram of an RFID inventory tracking system which incorporates the present invention.

The present invention will now be described in detail with reference to the figures. FIG. 1 illustrates an RFID inventory tracking system generally designated 10 according to the present invention. In the illustrated embodiment, system 10 is used in a shipping container 11 containing a multiplicity of pallets 13a,b, and a plurality of boxes 15 and 17 on pallet 13a, and a plurality of boxes 19 and 21 on pallet 13b. In the illustrated example, there are just two boxes on each pallet; however, this is just to simplify the explanation of the present invention. Typically, there are many more boxes on each pallet. Within box 15 are a multiplicity of packages 115a,b,c, within box 17 are a multiplicity of packages 117a,b,c, within box 19 are a multiplicity of packages 119a,b,c and within box 21 are a multiplicity of packages 121a,b,c. In the illustrated example, there are just three packages in each box; however this is just to simplify the explanation of the present invention. Typically, there are many more packages in each box.

Active RFID tags 33a,b are attached to pallets 13a,b, respectively. In the illustrated embodiment, packages 115a,b,c (containing products, not shown) include respective Passive RFID tags 215a,b,c, packages 117a,b,c (containing products, not shown) include respective Passive RFID tags 217a,b,c, packages 119a,b,c (containing products not shown) include respective Passive RFID tags 219a,b,c and packages 121a,b,c (containing products not shown) include respective Passive RFID tags 221a,b,c. The Passive RFID tags can be attached to the respective packages by sticky labels that contain flat RFID tags. Alternately, the products themselves within the packages can bear the Passive RFID tags. Alternately, the products themselves bear the Passive RFID tags, and there are not packages at all. Instead, the products are lumped into the boxes. Boxes 15, 17, 19 and 21 include respective Active RFID tags 315, 317, 319 and 321. The Active RFID tags can be attached to the respective boxes by adhesives or embedded within the container walls. There is also an Active RFID tag 400 attached to container 11. By way of example, container 11 is a shipping container such as that commonly found on an eighteen wheel truck or on a flat bed car of a train. By way of example, Active RFID tag 400 is attached to the underside of a ceiling of container 11.

Active RFID tag 315 transmits RF signals to Passive RFID tags 215a,b,c (and incidentally to other Passive RFID tags in the vicinity). The RF signals provide power to operate the Passive RFID tags 215a,b,c and identify the Active RFID tag 315. After authenticating the source of the RF information, each of the Passive RFID tags 215a,b,c broadcasts its identification in return. Active RFID tag 315 has a list of all Passive RFID tags within box 15. Active RFID tag 315 receives the identity of each Passive RFID tag 215a,b,c, confirms that they are in the list of all Passive RFID tags within box 15, and then hashes these identities. By way of example, the hashing comprises an XOR (exclusive or), Shift or other bitwise algorithm.

Active RFID tag 317 transmits RF signals to Passive RFID tags 217a,b,c (and incidentally to other Passive RFID tags in the vicinity). The RF signals provide power to operate the Passive RFID tags 217a,b,c and identify the Active RFID tag 317. After authenticating the source of the RF information, each of the Passive RFID tags 217a,b,c broadcasts its identification in return. Active RFID tag 317 has a list of all Passive RFID tags within box 17. Active RFID tag 317 receives the identity of each Passive RFID tag 217a,b,c, confirms that they are in the list of all Passive RFID tags within box 17, and then hashes these identities. By way of example, the hashing comprises an XOR (exclusive Or), Shift or other bitwise algorithm.

Active RFID tag 319 transmits RF signals to Passive RFID tags 219a,b,c (and incidentally to other Passive RFID tags in the vicinity). The RF signals provide power to operate the Passive RFID tags 219a,b,c and identify the Active RFID tag 319. After authenticating the source of the RF information, each of the Passive RFID tags 219a,b,c broadcasts its identification in return. Active RFID tag 319 has a list of all Passive RFID tags within box 19. Active RFID tag 319 receives the identity of each Passive RFID tag 219a,b,c, confirms that they are in the list of all Passive RFID tags within box 19, and then hashes these identities. By way of example, the hashing comprises an XOR (exclusive Or), Shift or other bitwise algorithm.

Active RFID tag 321 transmits RF signals to Passive RFID tags 221a,b,c (and incidentally to other Passive RFID tags in the vicinity). The RF signals provide power to operate the Passive RFID tags 221a,b,c and identify the Active RFID tag 321. After authenticating the source of the RF information, each of the Passive RFID tags 221a,b,c broadcasts its identification in return. Active RFID tag 321 has a list of all Passive RFID tags within box 21. Active RFID tag 321 receives the identity of each Passive RFID tag 221a,b,c, confirms that they are in the list of all Passive RFID tags within box 221, and then hashes these identities. By way of example, the hashing comprises an XOR (exclusive Or), Shift or other bitwise algorithm.

In an alternative embodiment of the present invention, Active RFID tags 315, 317, 319, 321 could also be sent information from another reader as a measure of the products in the container. For example, a forklift equipped with a reader can scan the products and hash the results as the products are loaded into the container or other storage unit. Then, the forklift reader sends the hashed results to the Active RFID tags 315, 317, 319, 321.

Active RFID tag 315 broadcasts its identity and hashed value (based on the hashing of the identities of Passive RFID tags 215a,b,c). Active RFID tag 317 broadcasts its identity and hashed value (based on the hashing of the identities of Passive RFID tags 217a,b,c). After authenticating Active RFID tag 315 and Active RFID tag 317, Active RFID tag 33a hashes the hashed values broadcast from Active RFID tag 315 and Active RFID tag 317, and broadcasts the result along with the identity of Active RFID tag 33a.

Active RFID tag 319 broadcasts its identity and hashed value (based on the hashing of the identities of Passive RFID tags 219a,b,c). Active RFID tag 321 broadcasts its identity and hashed value (based on the hashing of the identities of Passive RFID tags 221a,b,c). After authenticating Active RFID tag 319 and Active RFID tag 321, Active RFID tag 33b hashes the hashed values broadcast from Active RFID tag 319 and Active RFID tag 321, and broadcast the result along with the identity of Active RFID 33b.

After authenticating Active RFID tag 33a and Active RFID tag 33b, Active RFID tag 400 hashes the hashed values broadcast from Active RFID tag 33a and Active RFID tag 33b. Active RFID tag 400 stores and periodically broadcasts the hashed value that it computed from the hashed values broadcast from Active RFID tag 33a and Active RFID tag 33b. (Known software allows the reader to "focus" its read attempts to certain tags, for example, tags that begin with a certain alphanumeric. So if a shipping container had reusable tags for the pallets and the overall reader, then those could be "focused.")

When the shipping container 11 is initially loaded with pallets 13a,b and their boxes, the foregoing process is performed so that Active RFID tag 400 computes the initial hash value. Then, the shipping container is transported on a tractor-trailer truck, train, ship etc., and when it reaches each destination an external RFID Reader (not shown) reads the hashed value computed by Active RFID tag 400 and compares it to an expected hashed value. Preferably, the expected hash value is the original hash value determined by Active RFID tag 400 at the initial point of departure. Thus, if one of the Passive RFID tags is not working or missing at the initial point of departure, the expected hash value can still equal the actual hash value determined at the destination. Alternately, the expected hashed value is the hashed value that would result if all of the Passive RFID tags on all of the packages are present (their Passive RFID tags worked and the Active RFID tags properly performed their hashing functions). In either case, the external RFID Reader can obtain the expected hash value from a network. If the actual hashed value broadcast by Active RFID tag 400 at the destination matches the expected hash value, then the inventory in the shipping container is complete, i.e. nothing was lost during shipment. Because hashed values are broadcast by the Active RFID tags, the identities of the packages are hidden. The foregoing process is periodically repeated, so if some of the boxes are unloaded at a destination, new hashed values will be computed as described above for the remaining boxes (and the packages within the remaining boxes), and Active RFID tag 400 will broadcast a new hashed value to the external RFID Reader at the next destination. The external RFID Reader at the next destination will receive (securely via a network, such as PGP, SSH, SCP, or HTTPS) the expected hash value for the remaining contents of the shipping container, and compare the expected hash value to that broadcast from Active RFID tag 400. If they match, then the inventory in the shipping container is complete, i.e. nothing was lost during shipment.

Figure 2:
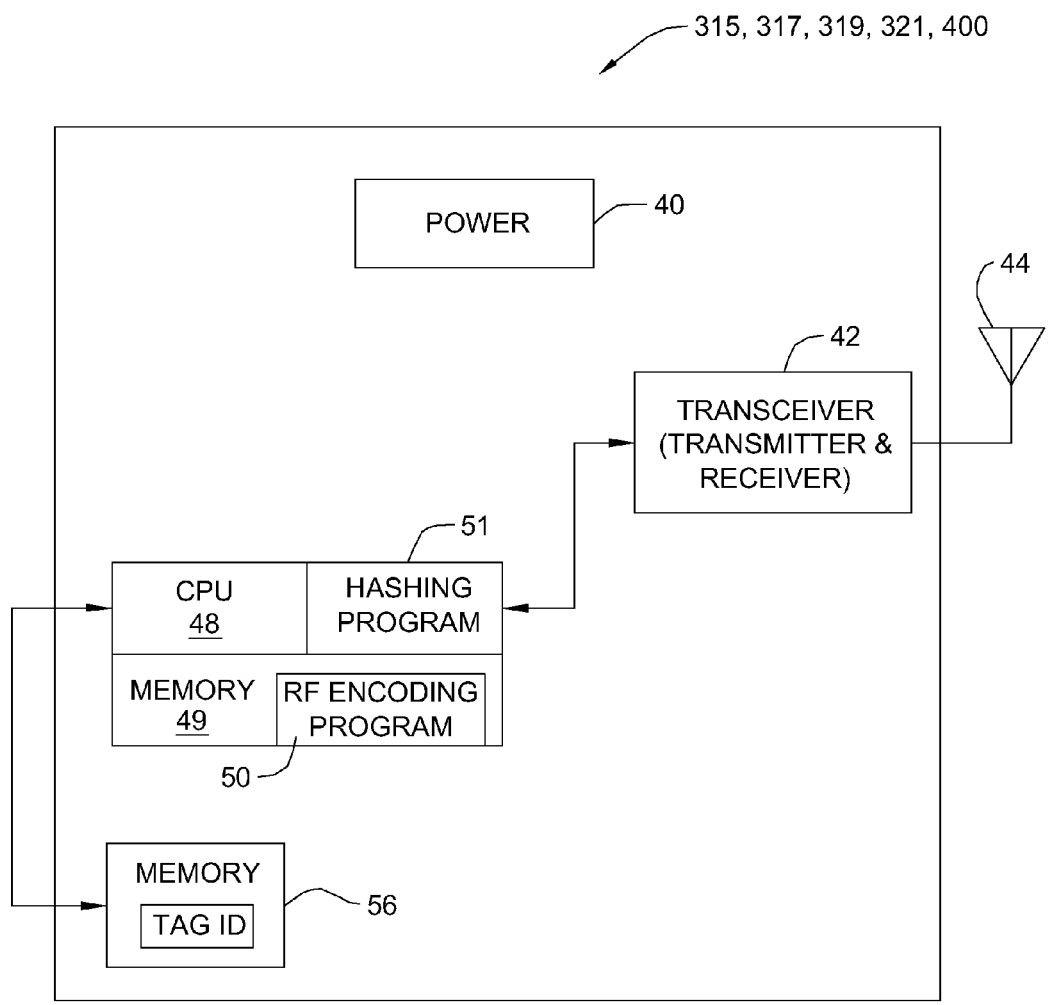
FIG. 2 is a block diagram of an Active RFID tag; such a tag is included within or attached to each box, each pallet and each shipping container of the RFID inventory tracking system of FIG. 1.

FIG. 2 illustrates each Active RFID tag 315, 317, 319, 321 and 400, in more detail. Each Active RFID tag includes a battery 40 (such as a Lithium-Ion battery), electronic transceiver circuitry 42, antenna 44, integrated circuit CPU 48, memory 49 (such as EEPROM or SRAM), and memory 56 (such as EEPROM or SRAM). Each Active RFID tag also includes a hashing program 51 in memory 49 for execution on CPU 48. Transceiver 42 includes a transmitter and a receiver coupled to antenna 44 to transmit and receive RF signals. An RF encoding program 50 in memory 49 executes on CPU 48 to initiate broadcast of the identity of the Active RFID tag to the Passive RFID tags. Memory 56 also stores the identity of Active RFID tag.

Figure 3:
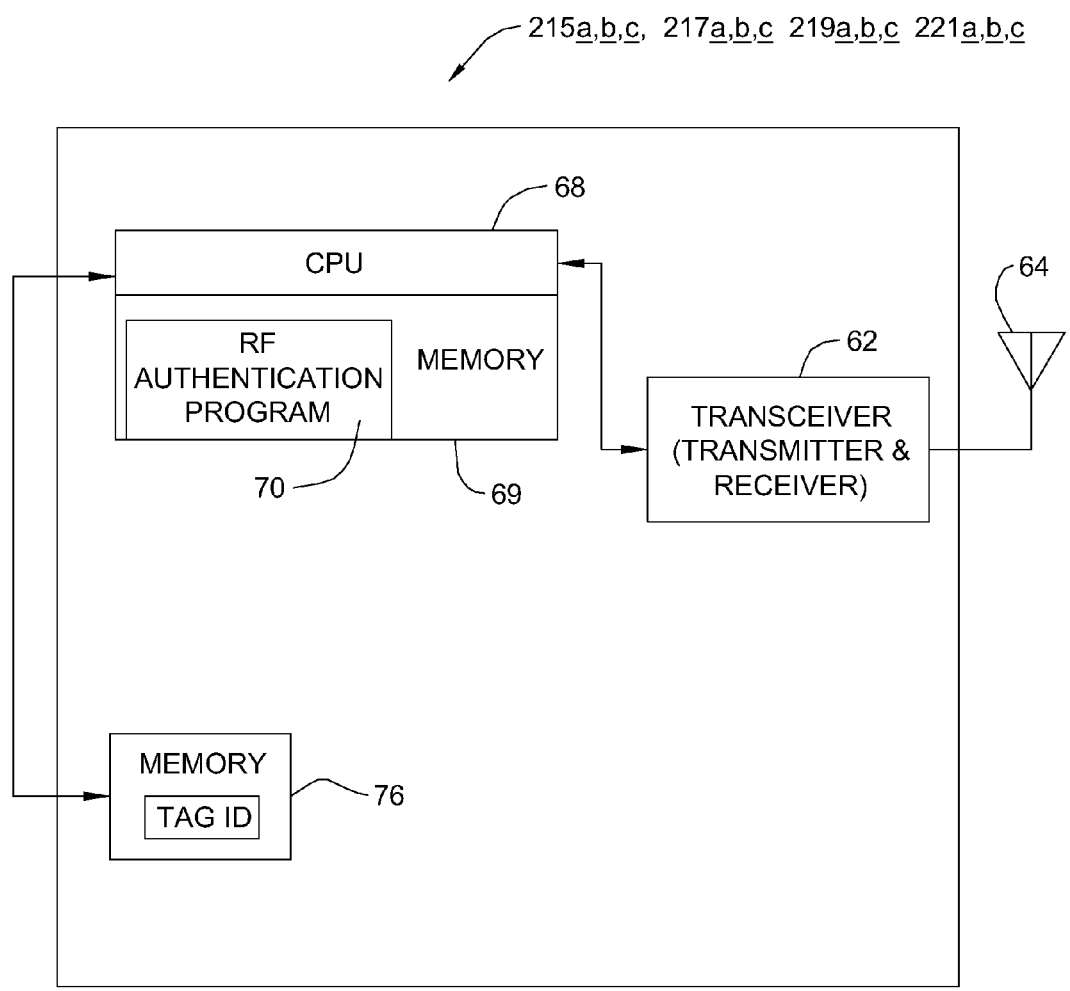
FIG. 3 is a block diagram of a Passive RFID tag within each package within the RFID inventory tracking system of FIG. 1.

FIG. 3 illustrates each Passive RFID tag 215a,b,c, 217a,b,c, 219a,b,c and 221a,b,c in more detail. Each Passive RFID tag comprises known types of CPU 68, memory 69 (such as EEPROM or SRAM), transceiver 62, antenna 64 for the transmitter and receiver, and memory 76 (such as EEPROM or SRAM). Memory 69 contains an RF authentication program 70 which executes on CPU 68 to authenticate a received RF signal and, if authentic, respond with the Passive RFID's identification.

Based on the foregoing, a system and method for tracking inventory of a container have been disclosed. However, numerous modifications and substitutions can be made without deviating the scope of the present invention. For example, in system 10, the Active RFID tags 33a and 33b can be omitted, Active RFID tag 400 hashes the hashed values broadcast by Active RFID tags 315, 317, 319 and 321, and the hashed valued computed by Active RFID tag 400 and transmitted to an external transceiver is compared to an expected value similarly computed at the initial point of departure. As another example, Active RFID tags could substitute for the Passive RFID tags for items 115a-c, 117a-c, 119a-c, and 121a-c in FIG. 1. In another embodiment of the present invention, there is another layer in the RFID hierarchy such that Active RFID tag 400 reads multiple tags (akin to Active RFID tags 33a,b), but these would read sections of tags on the Active RFID tag 33 level. In other words, Active RFID tag 400 would read Active RFID tags 500-50X which would read Active RFID tags 33a-x which would read Passive RFID tags 315, 317, 319. Therefore, the present invention has been disclosed by way of illustration and not limitation, and reference should be made to the following claims to determine the scope of the present invention.

What is claimed is:

1. A system for tracking inventory, said system comprising:
    a first plurality of RFID tags attached to a first, respective plurality of products within a first container, each of said first plurality of RFID tags including means for broadcasting its respective identity;
    a second plurality of RFID tags attached to a second, respective plurality of products within a second container, each of said second plurality of RFID tags including means for broadcasting its respective identity;
    a third, Active RFID tag attached to said first container and including means for hashing the identities broadcast by said first plurality of RFID tags, and broadcasting a result of said hashing of the identities broadcast by said first plurality of RFID tags;
    a fourth, Active RFID tag attached to said second container and including means for hashing the identities broadcast by said second plurality of RFID tags, and broadcasting a result of said hashing of the identities broadcast by said second plurality of RFID tags; and
    a fifth, Active RFID tag attached to a third container containing all of said first containers with said first plurality of RFID tags and containing all of said second containers with said second plurality of RFID tags, said fifth Active RFID tag including means for generating a hash value based in part on the results broadcast by said third and fourth Active RFID tags.

2. A system as set forth in claim 1 wherein said first container is a first package and said container is a second package.

3. A system as set forth in claim 2 wherein said third container is a shipping container sized and adapted for shipping as a body of a tractor trailer truck.

4. A system as set forth in claim 1 wherein said first container is a first box, and said second container is a second box.

5. A system as set forth in claim 1 further comprising:
    means for comparing an expected hashed value to a result of the means, within said fifth Active RFID tag, for hashing results broadcast by said third and fourth Active RFID tags.

6. A system as set forth in claim 1 wherein said first plurality of RFID tags and said second plurality of RFID tags are respective first and second pluralities of Passive RFID tags.

* * * * *